(12) United States Patent
Chang et al.

(10) Patent No.: US 10,107,654 B2
(45) Date of Patent: Oct. 23, 2018

(54) ROTARY PROBE HEAD

(71) Applicant: Nikon Corporation, Tokyo (JP)

(72) Inventors: Patrick S. Chang, Burlingame, CA (US); Matthew David Rosa, Fremont, CA (US); Johnathan A. Marquez, San Diego, CA (US); Michel Pharand, Los Gatos, CA (US)

(73) Assignee: Nikon Corporation, Tokyo (JP)

( * ) Notice: Subject to any disclaimer, the term of this patent is extended or adjusted under 35 U.S.C. 154(b) by 246 days.

(21) Appl. No.: 15/255,108

(22) Filed: Sep. 1, 2016

(65) Prior Publication Data

US 2017/0059296 A1 Mar. 2, 2017

Related U.S. Application Data

(60) Provisional application No. 62/213,405, filed on Sep. 2, 2015.

(51) Int. Cl.
*G01B 5/00* (2006.01)
*G01D 11/30* (2006.01)
*G01B 5/012* (2006.01)
*G01B 11/00* (2006.01)

(52) U.S. Cl.
CPC ............ *G01D 11/30* (2013.01); *G01B 5/012* (2013.01); *G01B 11/007* (2013.01)

(58) Field of Classification Search
CPC .... G01B 21/042; G01B 11/007; G01B 5/012; G01D 18/00; G01D 11/30
USPC ........................................................ 33/503
See application file for complete search history.

(56) References Cited

U.S. PATENT DOCUMENTS

| | | | | |
|---|---|---|---|---|
| 5,189,806 A | * | 3/1993 | McMurtry | G01B 21/04 33/503 |
| 5,665,896 A | * | 9/1997 | McMurtry | G01B 21/042 73/1.75 |
| RE42,082 E | * | 2/2011 | Raab | B25J 18/002 33/1 N |
| 8,296,098 B2 | * | 10/2012 | Mills | G01B 5/20 33/553 |
| 8,336,219 B2 | * | 12/2012 | Grzesiak | G01B 21/042 33/502 |
| 9,863,766 B2 | * | 1/2018 | Wallace | G01B 21/042 |
| 2003/0167647 A1 | * | 9/2003 | Raab | B23Q 35/04 33/503 |
| 2006/0266100 A1 | * | 11/2006 | McMurtry | G01B 3/30 73/1.79 |
| 2013/0107032 A1 | * | 5/2013 | Yamada | B25J 11/00 348/86 |
| 2014/0215841 A1 | * | 8/2014 | Danbury | G01B 5/008 33/503 |

(Continued)

*Primary Examiner* — Yaritza Guadalupe-McCall
(74) *Attorney, Agent, or Firm* — Beyer Law Group LLP

(57) ABSTRACT

A rotary probe head having a dual interface for probe mounting that allows two separate interfaces to be mounted on opposite sides of the "A" or elevation axis of the rotary probe head. The two interfaces can be rotatable and interchangeable and allow for increased flexibility in handling different types of attachments including attachments having widely different mass, size, and/or interface connections. A probe can be mounted to one interface and a counterweight can be mounted to the opposite interface for improved holding torque performance by reducing the duty force and heat factor generation of the motor in the probe head.

20 Claims, 13 Drawing Sheets

(56) References Cited

U.S. PATENT DOCUMENTS

2016/0138911 A1* 5/2016 Wallace ............... G01B 21/042
                                                                                                     73/1.79
2017/0059296 A1* 3/2017 Chang .................... G01D 11/30

* cited by examiner

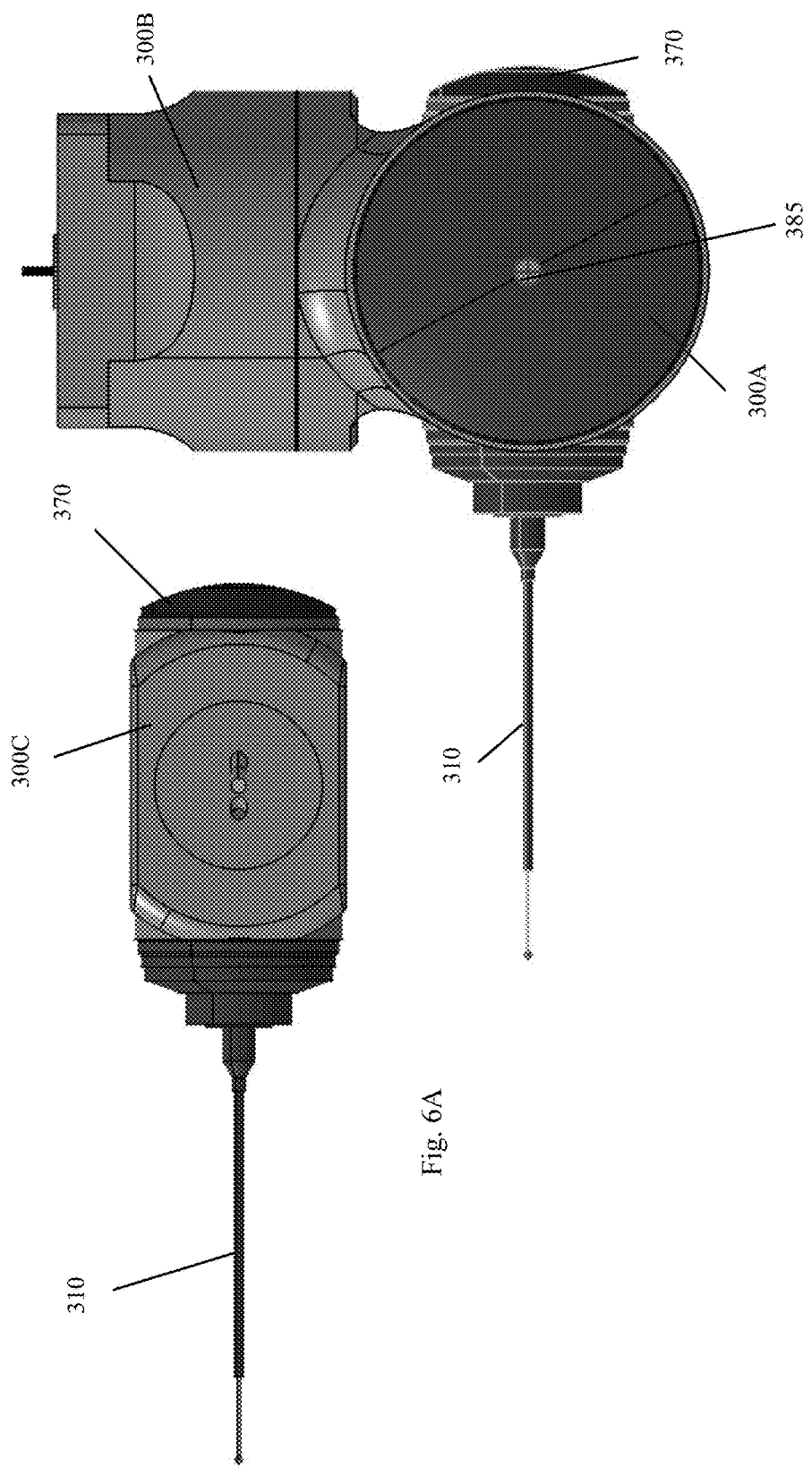

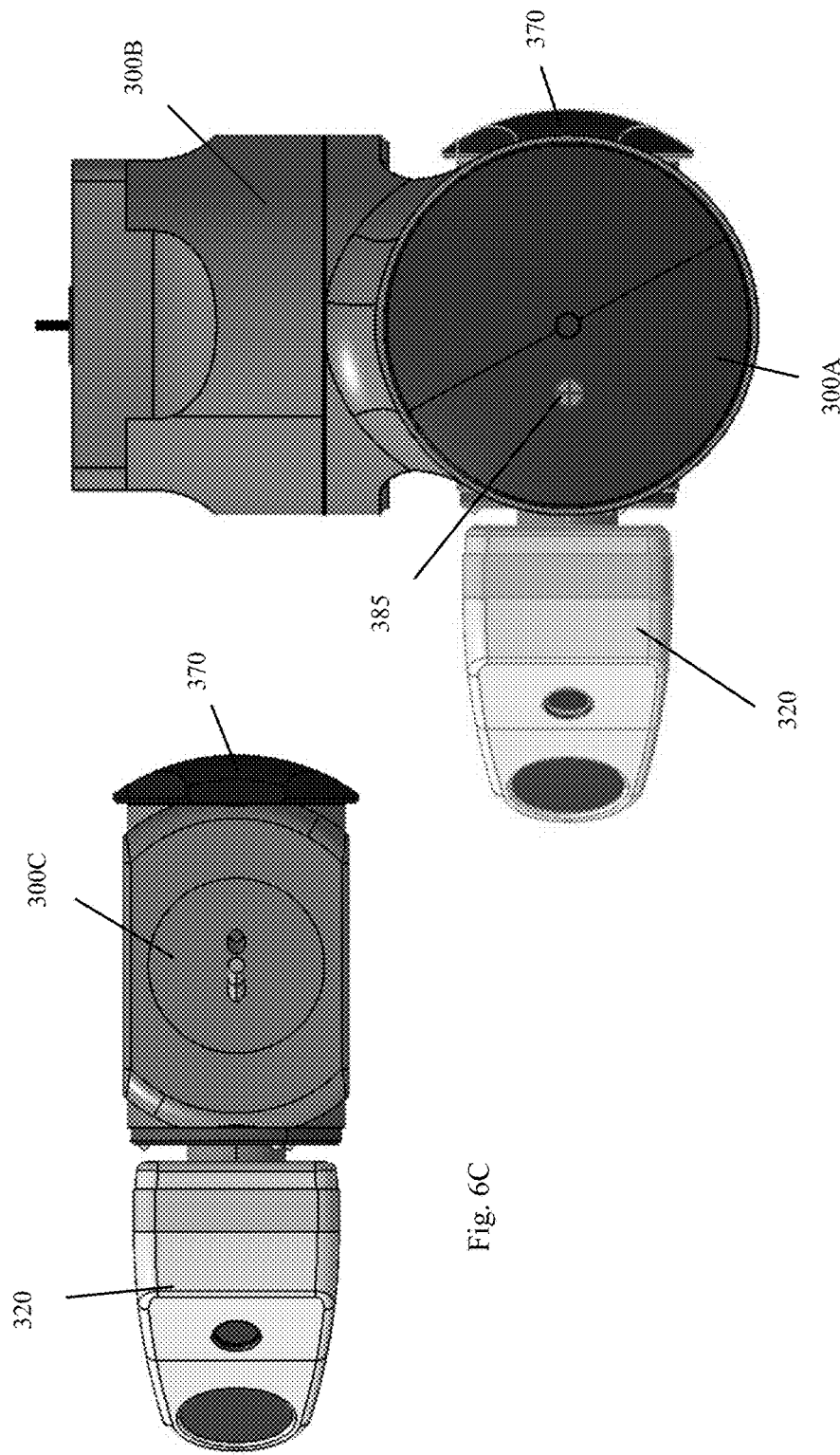

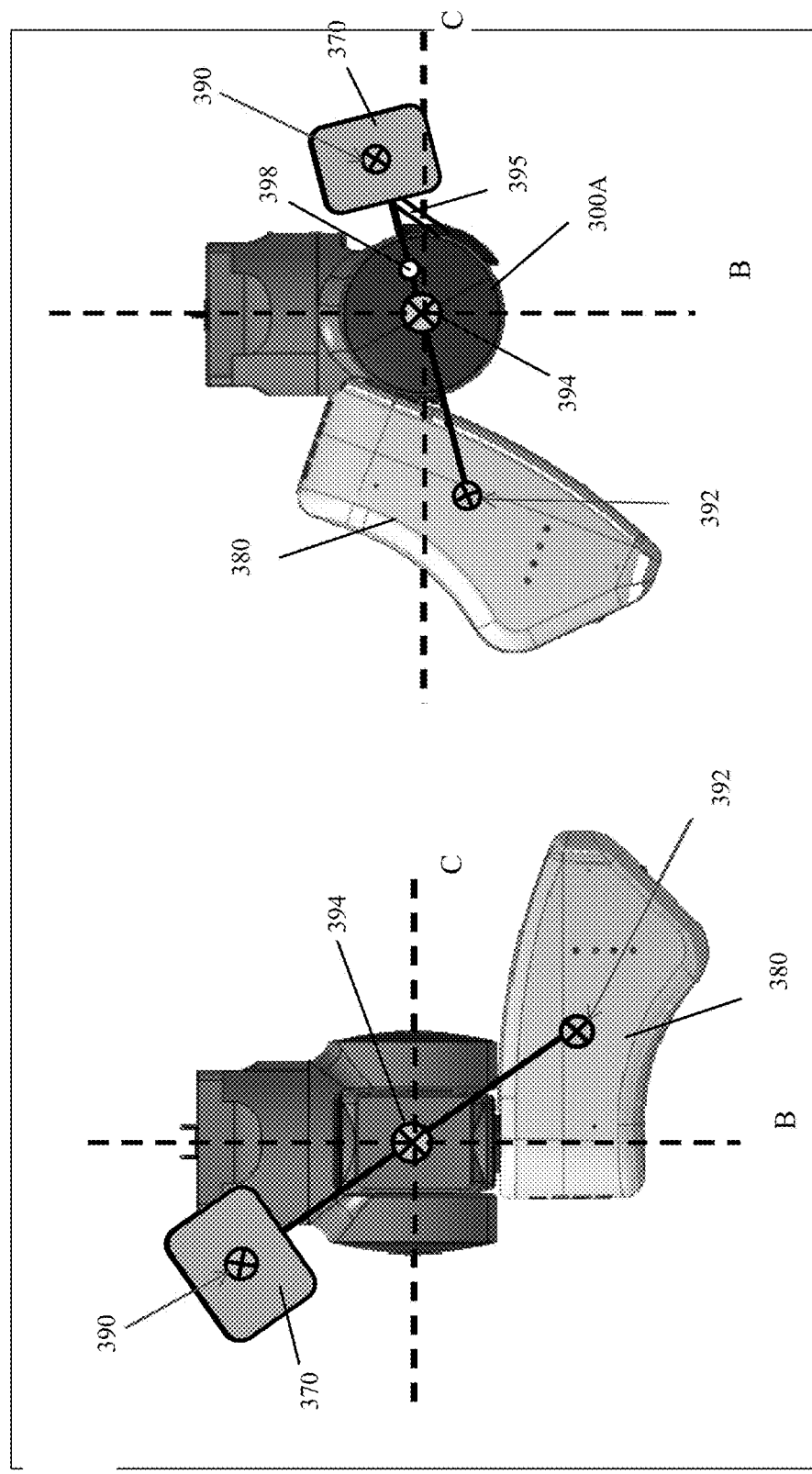

ROTARY PROBE HEAD

CROSS-REFERENCE TO RELATED APPLICATIONS

This application claims priority to U.S. Provisional Application No. 62/213,405, filed on Sep. 2, 2015, the contents of which are incorporated herein by reference in their entirety.

BACKGROUND

The present invention relates generally to rotary probe heads. More particularly, the invention relates to rotary probe heads for mounting probes.

A coordinate measuring machine ("CMM") is used to measure the geometrical characteristics of an object. A CMM may be manually controlled by an operator or it may be computer controlled. The measurements made by a CMM 10 are made by a probe attached to a rotary probe head 100, as shown in FIG. 1A. A variety of probes can be used with CMMs, including mechanical, optical, laser, and white light probes. As shown in FIG. 1A, the rotary probe head 100 is a tool that is commonly mounted on the spindle 50 of a CMM 10 for attaching and moving a probe that measures dimensions of an object. FIG. 1B shows an example of a probe head 100.

Typically, a probe head is actuated to a position and orientation such that the probe can touch and measure an object. In the embodiment shown in FIG. 1B, a touch or stylus probe 110 is attached to the probe head 100. As shown in FIG. 1B, the probe head 100 is mounted on the spindle 50 of a CMM. Servomotors are typically used to actuate and also hold the probe in place while measurements are performed. As shown in FIG. 1B, the probe head 100 has two rotational axes: A and B. In addition to the A and B axes shown in FIG. 1B, some rotary probe heads, such as the rotary probe head 200 shown in FIG. 2, have a third rotational axis, the "C-axis."

Typically, a rotary probe head can support "stylus" type probes having a mass of about 100 g. Stylus interfaces on rotary probe heads use a kinematically-mounted magnetic interface to attach a stylus probe to the rotary probe head. Laser probes require a different type of interface because the laser probes are much more massive than stylus probes, and a simple magnetic interface is not strong enough to support a laser probe. However, mounting payloads of widely different mass, size, and interface connections on a probe head can be a problem. For example, the "stylus" type probes mentioned above are considered low mass probe tips whereas laser probe heads have much higher mass. If two probes of widely different mass and size are mounted on a probe head, the performance of the probe head may be compromised. Thus, it would be desirable to provide a rotary probe head that can allow for greater flexibility in probe/sensor compatibility as well as improved motor control performance.

SUMMARY

In accordance with an embodiment, a rotary probe head is provided. The rotary probe head includes a main body configured to rotate about a first axis, a stem subassembly, and a rotating probe mount. The stem subassembly connects the main body with a spindle of a coordinate measuring machine, and is configured to rotate about a second axis. The main body and the stem subassembly are rotatably attached. The rotating probe mount is rotatably attached to the main body, and the rotating probe mount has a first interface for attaching a probe. The first interface is configured to rotate about a third axis, and a counterweight is attached on a side of the probe mount opposite the first interface. The counterweight is configured to shift along a direction not parallel to the third axis.

In accordance with another embodiment, a method is provided for using a rotary probe head. The rotary probe head having a probe mount having a first interface and a second interface is provided. The first and second interfaces are mounted on opposite sides the probe mount relative to a first axis of the rotary probe head. Each of the first and second interfaces is configured for attaching a probe or counterweight. A probe is attached to the first interface, and a counterweight is attached to the second interface. The counterweight has a moment that substantially counteracts a moment of the probe attached to the first interface.

BRIEF DESCRIPTION OF THE DRAWINGS

The invention, together with further objects and advantages thereof, may best be understood by reference to the following description taken in conjunction with the accompanying drawings in which:

FIG. 6A shows an embodiment of the C-Axis subassembly having a stylus probe mounted on one interface and a counterweight mounted on the opposite interface.

FIG. 6B shows the C-Axis subassembly of FIG. 6A attached to the other subassemblies of a rotary probe head.

FIG. 6C shows an embodiment of the C-Axis subassembly having a laser probe mounted on one interface and a counterweight mounted on the opposite interface.

FIG. 6D shows the C-Axis subassembly of FIG. 6C attached to the other subassemblies of a rotary probe head.

FIGS. 7A-7C show an embodiment of a rotary probe head having an off-axis payload mounted on a rotating interface.

DETAILED DESCRIPTION OF THE PREFERRED EMBODIMENTS

The present invention relates generally to rotary probe heads. More particularly, the invention relates to a rotary probe head that allows two separate interfaces to be mounted on opposite sides of the "A" or elevation axis of the rotary probe head. The two interfaces can be interchangeable and allow for increased flexibility in handling different types of attachments including attachments having widely different mass, size, and/or interface connections.

For example, according to an embodiment, a rotary probe head has two interfaces on opposite sides of the A-axis. An interface on one side is capable of mounting both a low mass stylus probe tip, which typically has a mass of about 10 g, and a high mass laser probe head, which typically has a mass of about 300 g-1 kg. The rotary probe head has an interface on the opposite side of the A-axis for mounting either a low mass or high mass counterweight. A laser probe head can have a mass that is about 100 times the mass of the low mass stylus probe tip. A probe, especially a relatively heavy laser probe, mounted on one interface can create instability for the probe head. Thus, as described with reference to the embodiments described herein, a removable counterweight can be provided to allow for greater flexibility in probe/sensor compatibility and improved motor control stability.

Embodiments described herein include interfaces that are capable of supporting probes having different masses, including laser probes and stylus probes. Embodiments described herein include interfaces that are capable of not only supporting different types of probes but also counterweights having different masses.

Figure 1A:
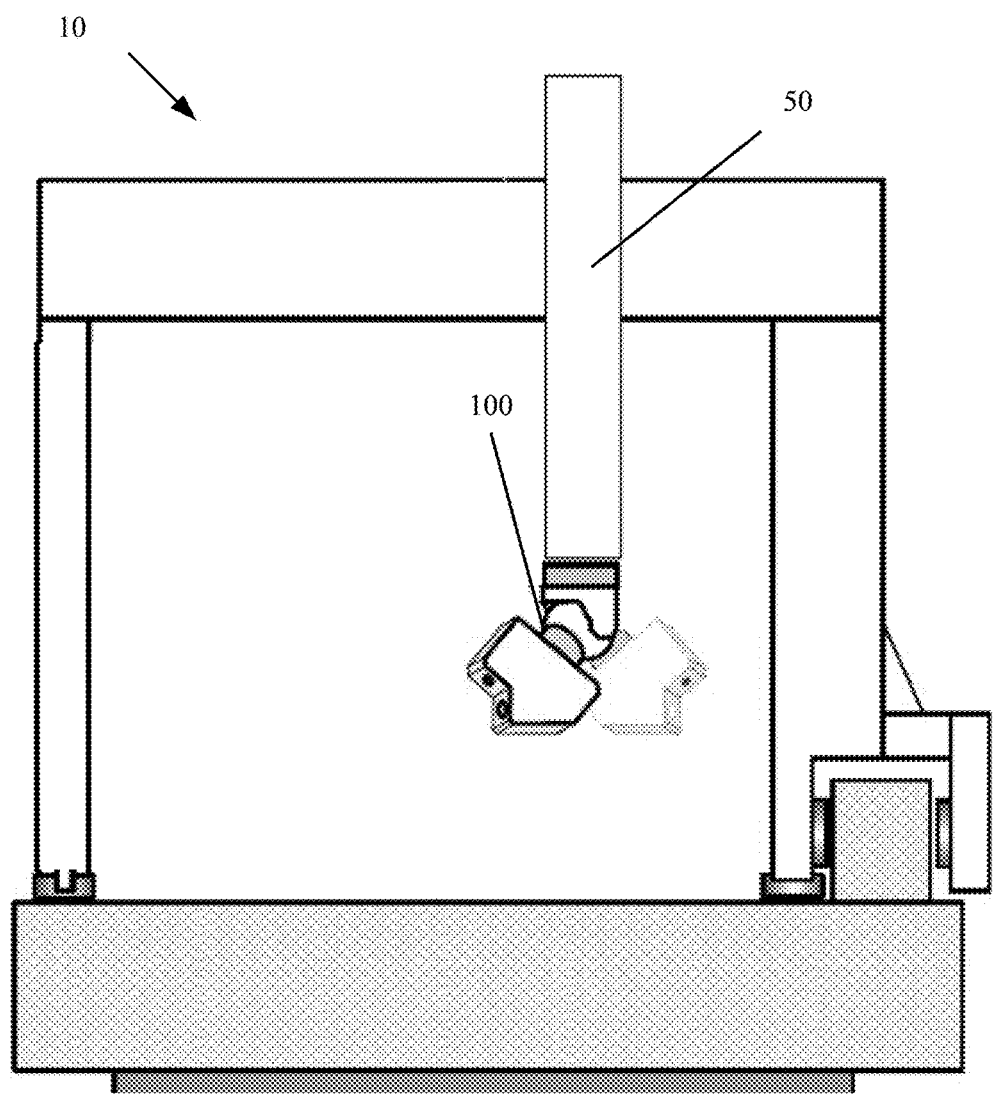
FIG. 1A shows an embodiment of a coordinate measuring machine.
Figure 1B:
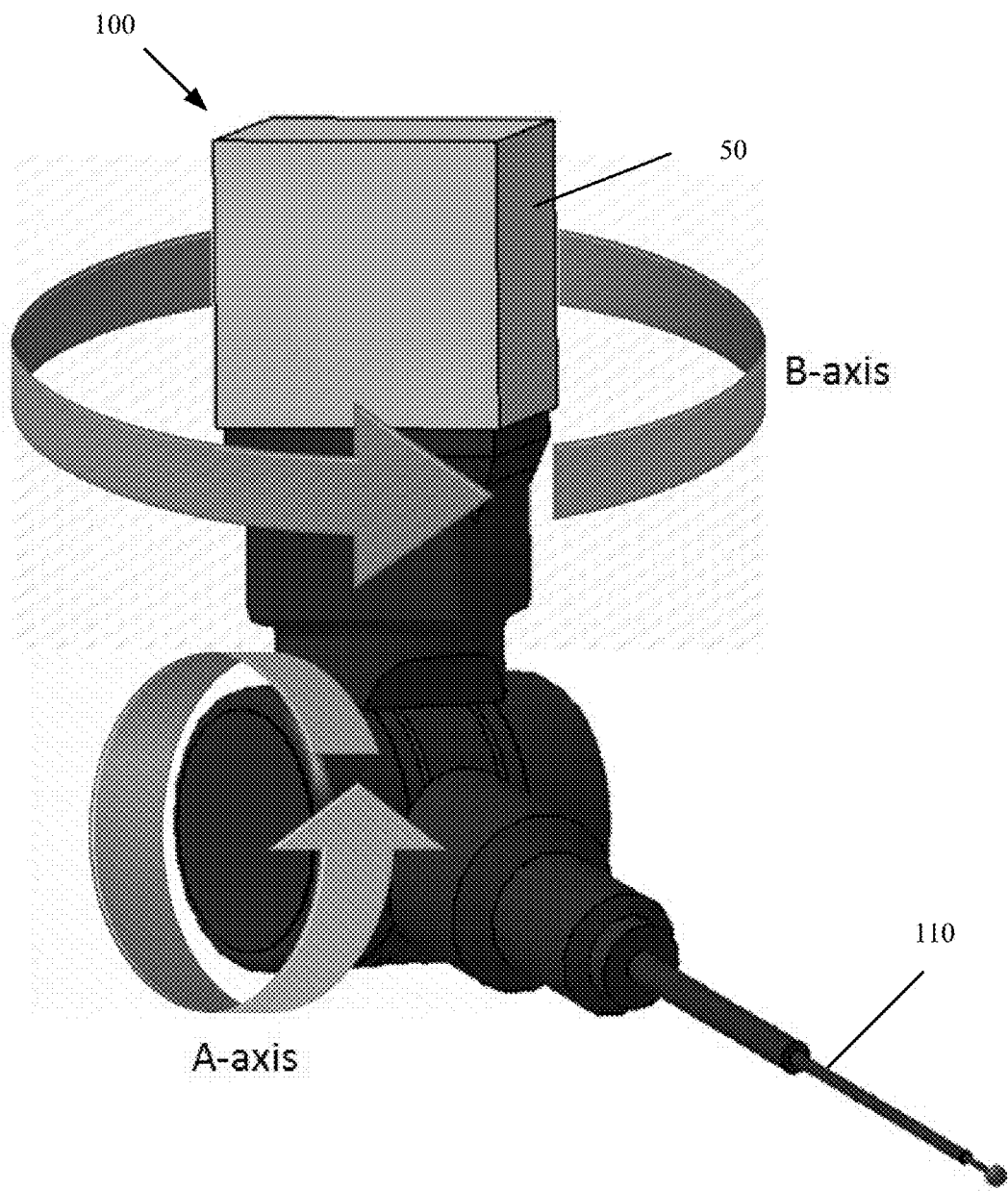
FIG. 1B shows an embodiment of a rotary probe head having two rotational axes.
Figure 2A:
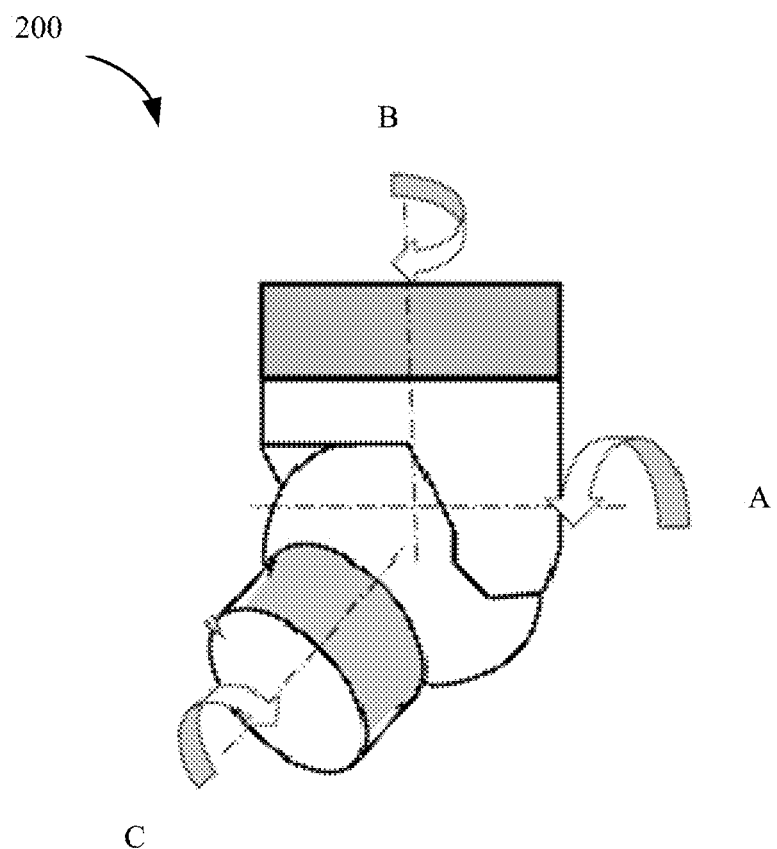
FIG. 2A shows another embodiment of a rotary probe head having three rotational axes.

Embodiments of a dual interface rotary probe head will be described herein. By placing two separate interfaces onto the rotary probe head, stylus probes and laser probes can be mounted independently from one another on opposite sides of the probe head, allowing for the interface methods to be different and separated and, as a result, greatly simplified. As shown in FIG. 2A, a rotary probe head 200, as described herein, has a third rotational axis, the "C-axis." This C-axis is in addition to the first and second (A and B) axes that are described above with reference to FIG. 1B.

Figure 2B:
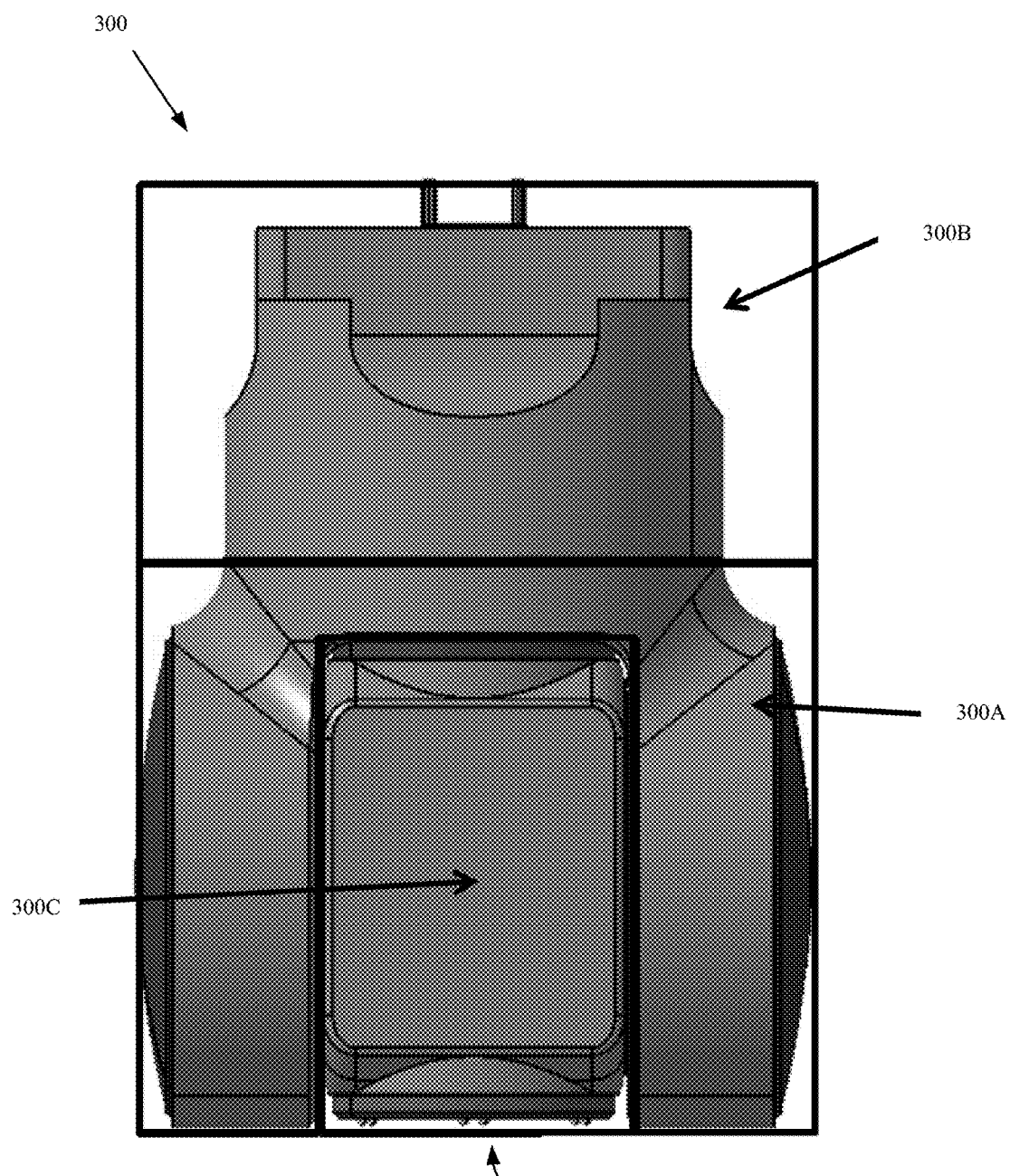
FIG. 2B is a side view of an embodiment of a rotary probe head, showing the subassemblies.
Figure 2C:
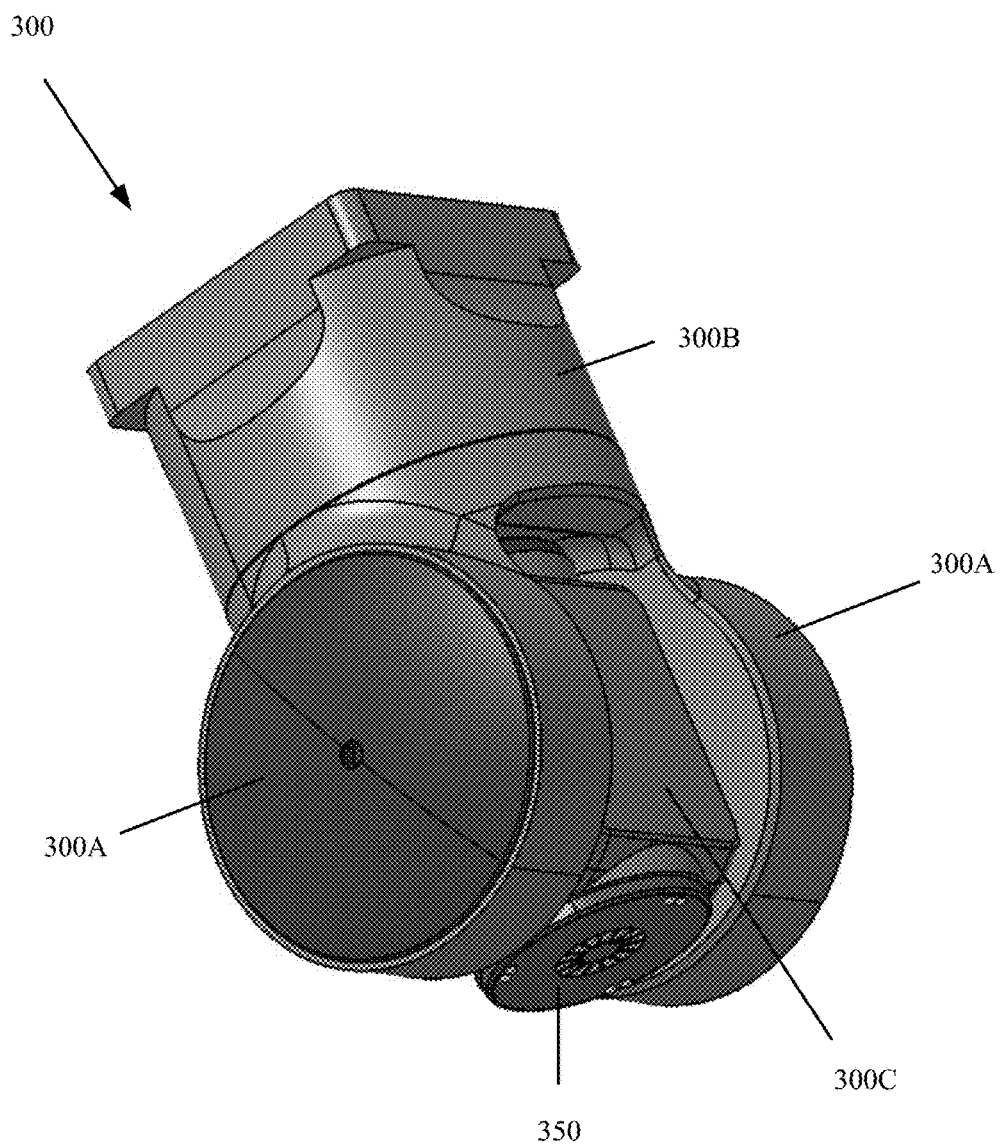
FIG. 2C is a perspective view of the embodiment shown in FIG. 2B.

FIG. 2B is a side view of an embodiment of a rotary probe head 300, showing the subassemblies 300A, 300B, 300C. The B-Axis subassembly 300B or stem portion is attached to the spindle 50 of the CMM and the B motor 320 (see FIG. 3), which is housed within the B-Axis subassembly 300B, rotates the A-Axis subassembly 300A and main body about the B-axis. As will be described in more detail below, the C-Axis subassembly 300C or rotating probe mount rotates about the A-axis and rotating interfaces 350 mounted on the C-Axis subassembly 300C rotate the mounted probes (e.g., stylus, laser, etc.) about the C-axis. FIG. 2C is a perspective view of the embodiment shown in FIG. 2B. It will be noted that, in a "working position," with the probe facing downward, the B-axis and the C-axis are aligned.

Figure 3:
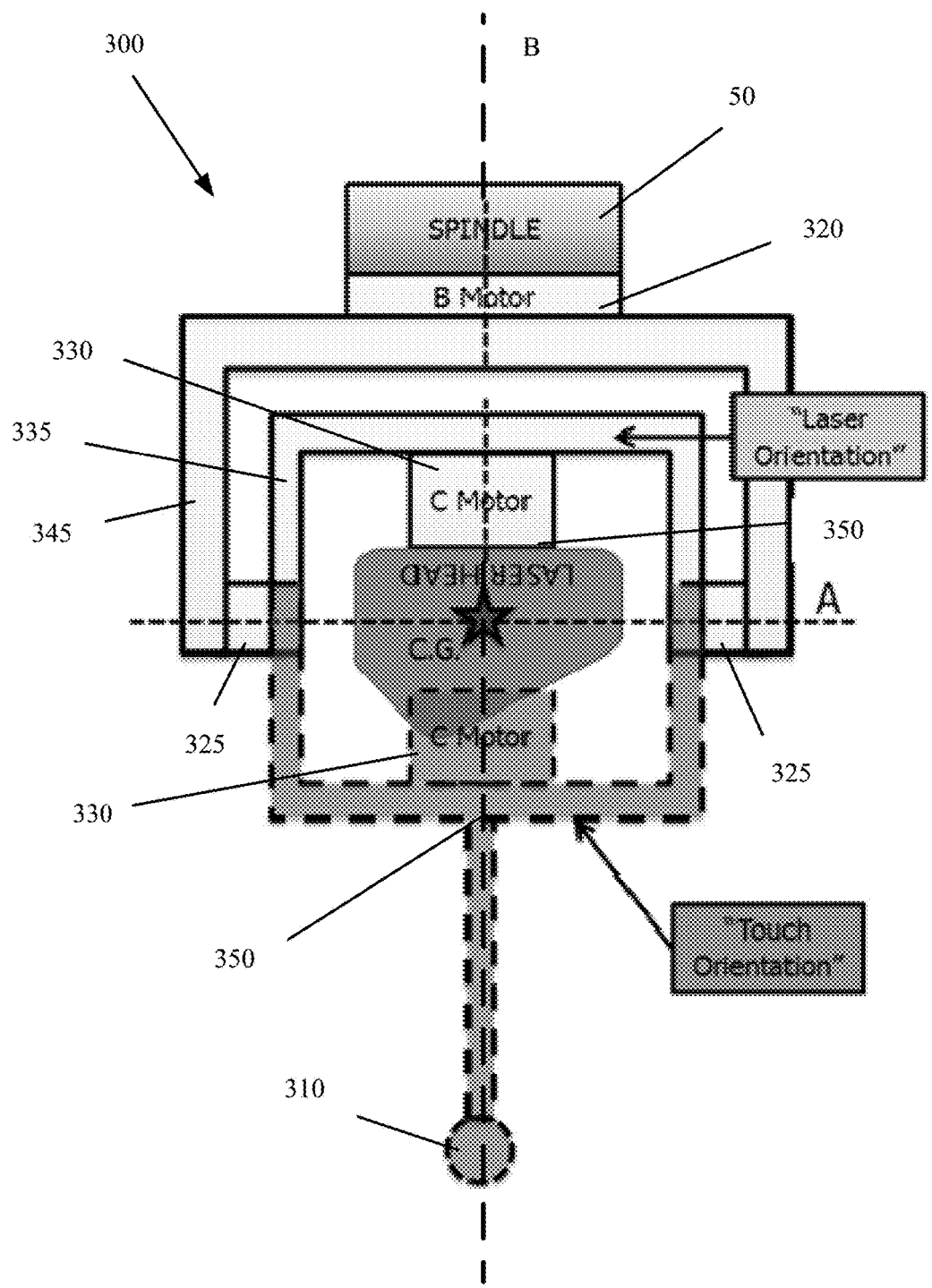
FIG. 3 is a simplified side view representation of an embodiment of a design concept for a rotary probe head having three rotational axes.

FIG. 3 is a simplified side view representation of an embodiment of design concept for a rotary probe head 300 having three rotational axes. In the embodiment shown in FIG. 3, the probe head 300 is attached to the spindle 50 of a CMM via the B motor 320, which rotates the A-Axis subassembly about the B-axis. An outer gimbal 345 is mounted to the B motor 320.

As shown in FIG. 3, in this embodiment, the probe head 300 has two orientations for connecting probes: a "laser orientation" that supports probes with large masses, and a "stylus orientation" that is about 180° offset from the "laser orientation" for supporting lighter probes, such as stylus probes. The A motor 325, which is mounted on the outer gimbal 345, rotates an inner gimbal 335 to position one of the probes in the downward position in order to take a measurement. As shown in FIG. 3, both positions of the inner gimbal 335 and the probes are shown. The inner gimbal 335 can be positioned either in a "laser orientation" or in a "touch orientation" (shown in dotted lines in FIG. 3). In the illustrated embodiment, when the inner gimbal 335 is in the "laser orientation," a laser head attached to one of the interfaces 350 is pointed downward and can be used to take measurements. When the inner gimbal 335 is in the "touch orientation" (as shown by the dotted lines in FIG. 3), a stylus probe attached to the opposite interface 350 is pointed downward and can be used to take measurements. It will be noted that, in some embodiments, each of the interfaces 350 is configured to support either a probe or counterweight having a larger mass (e.g., laser probe) or a probe or counterweight having a smaller mass (e.g., stylus probe).

The simplified representation of FIG. 3 illustrates that ideally, the center of gravity of the laser probe is coincident with the A-axis in order to minimize the moment about the A-axis. It will be understood that when a moment is present, the motor needs to apply a holding torque, which, in turn, generates heat. The moment about the A-axis can be substantially minimized by the mass of the counterweight. The larger the holding torque, the more heat is generated, which can be detrimental to the performance of the probe head. In the embodiments shown in FIGS. 2, 4, and 5, the shaft mounted on the A-axis has the same function as the inner gimbal 335 of FIG. 3. The shaft design of FIGS. 2, 4, and 5 has the same ultimate goal as the inner gimbal 335 of moving the center of gravity of the system close to the A-axis.

Figure 4:
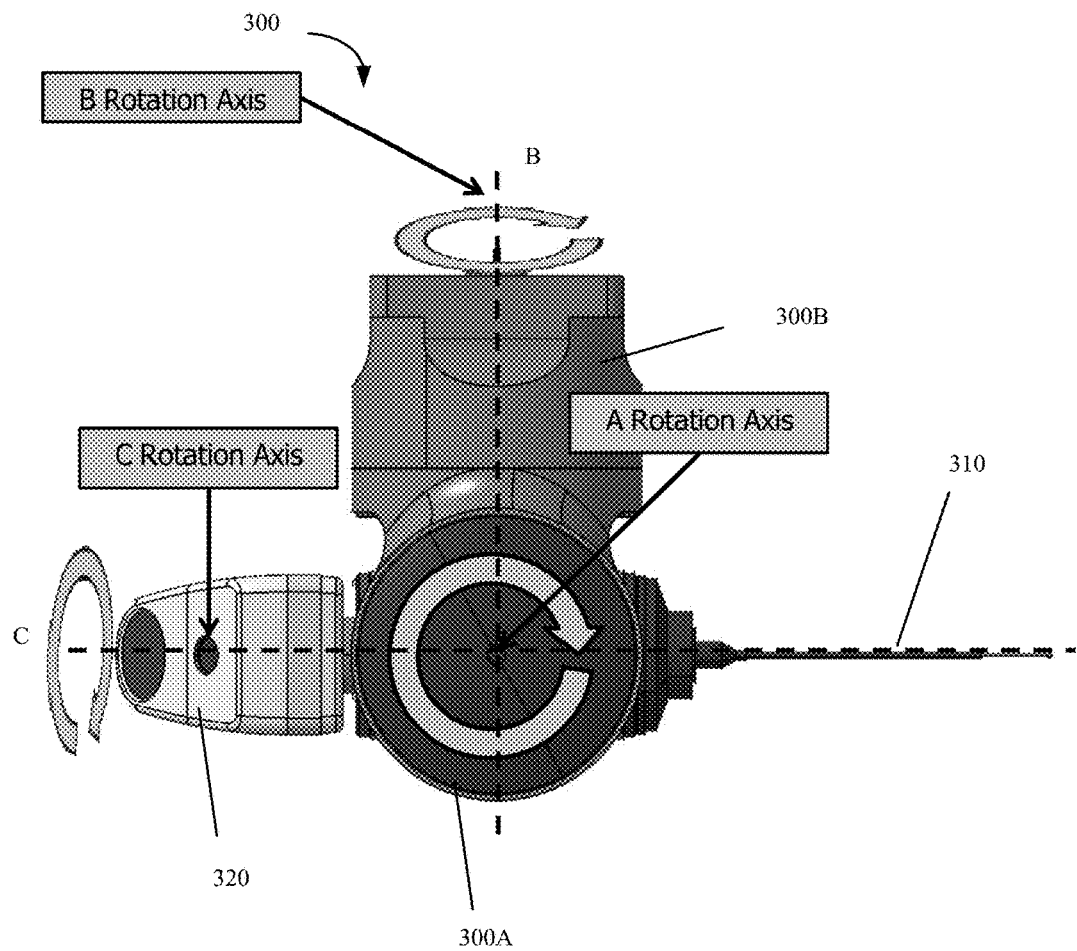
FIG. 4 is a side view of an embodiment of a rotary probe head with a probe attached to each interface.
Figure 5:
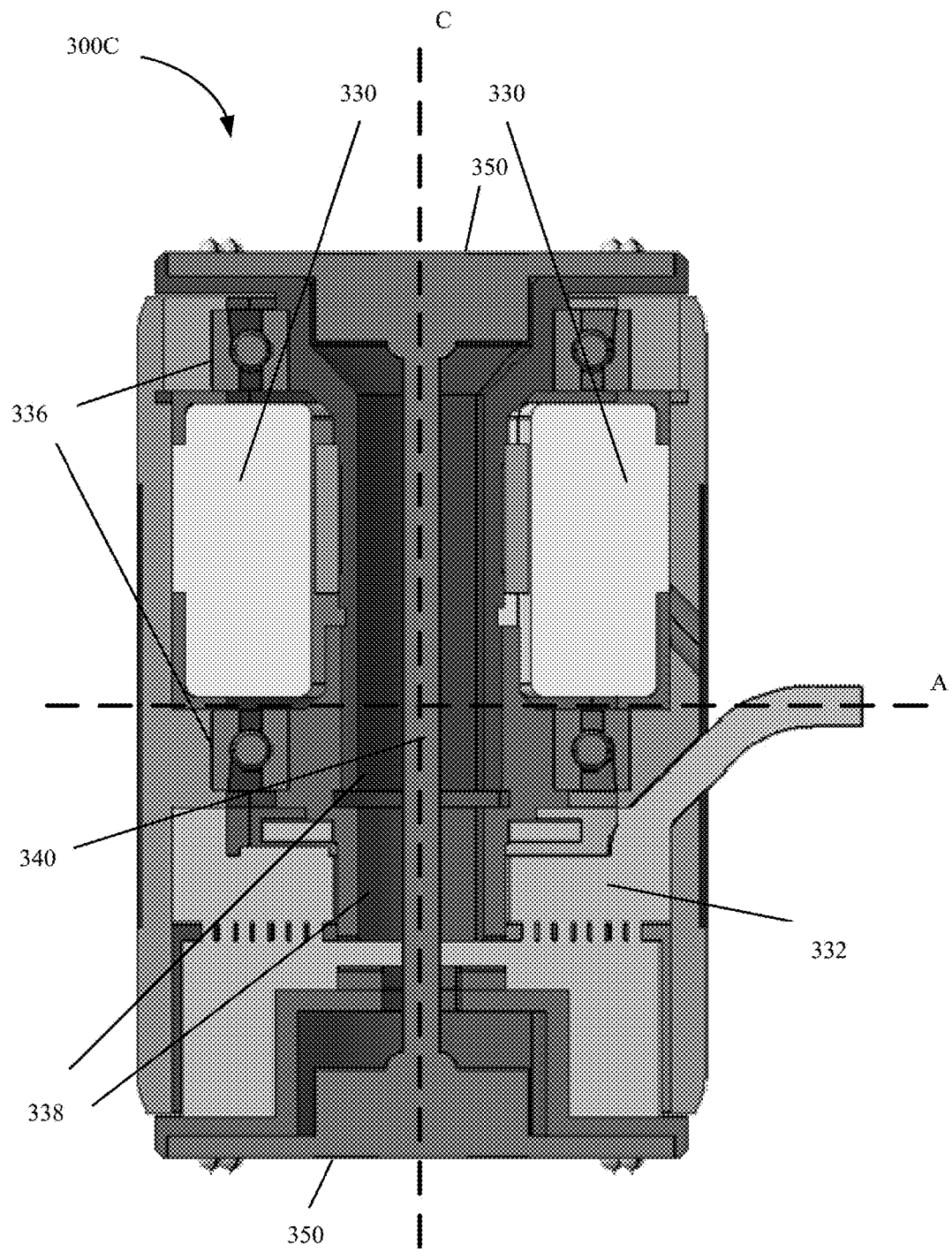
FIG. 5 is a cross-sectional side view of the C-Axis subassembly in accordance with an embodiment.

FIG. 4 is a side view of an embodiment with a probe attached to each interface 350 and FIG. 5 is a cross-sectional side view of the rotating probe mount or C-Axis subassembly 300C. As illustrated in FIG. 4, both probes are oriented horizontally. The horizontal orientation is a valid orientation for measuring an object directly to the side of the rotary probe head 300. However, it should be noted that FIG. 4 does not depict a "working scenario" because both a laser probe and a stylus probe are attached at the same time. To obtain measurements of an object below the probe head, the interfaces 350 should be rotated about the C-axis so that a probe is also rotated such that it is in a downward position, as illustrated in FIG. 3 by the stylus probe 310. Both rotating probe interfaces 350 that are on opposite sides of the A-axis are driven by the same "C-motor" 330 via a shaft 340 that extends through the body of the probe head, as shown in FIG. 5. As noted above, the inner gimbal 335 is rotated about the A-axis by the A motor 325. In the illustrated embodiment, the rotating interfaces 350 of the probe mount 300C are offset from one another by about 180°. It will be understood that, in other embodiments, the rotating interfaces 350 can be offset from one another by about 170°-190°. In still other embodiments, the interfaces 350 can be on different faces of the rotary probe head 300 and each interface 350 can be driven by different motors. In some embodiments, one of the interfaces 350 can be fixed and not rotatable.

FIG. 5 also shows other parts of the C-Axis subassembly 300C, including spindle bearings 336 and the C-axis spindle 338. In the illustrated embodiment, the C-axis spindle 338 includes two parts, as shown in FIG. 5, that are screwed together. FIG. 5 also shows that there is some space 332 in the C-Axis subassembly 300C for other items, such as electronics and slip rings. The C-axis position can be measured using a rotary encoder and driven by the C-axis motor using feedback control.

In an embodiment, the C-Axis subassembly 300C and the probe are balanced about the A-axis. Therefore, the center of gravity of the C-Axis subassembly 300C itself will be placed on the opposite side of the A-axis from where the heaviest probe is mounted. It will be understood that the C-Axis subassembly 300C itself is not balanced at the A-axis, but the C-Axis subassembly with the probe mounted is nominally balanced at the A-axis. Thus, because different probes have different masses, the net center of gravity of the C-Axis subassembly and the probe will change based on the probe mounted, but an additionally-mounted counterweight helps balance that discrepancy.

In practice, it is likely that only one interface 350 is used to attach a probe at a time, since more than one probe is generally not necessary. However, it can be advantageous to use the second, opposite interface 350 for attaching a counterweight 370 for improved performance by reducing the holding torque generated by the offset center of gravity, especially when a probe having a large mass (e.g., laser probe 320) is attached to one of the interfaces 350. FIG. 6A shows an embodiment of the C-Axis subassembly having a stylus probe 310 mounted on one interface 350 and a counterweight 370 mounted on the opposite interface 350. FIG. 6B shows the C-Axis subassembly 300C of FIG. 6A mounted attached to the other subassemblies 300B, 300A of a rotary probe head 300. FIG. 6B also shows the expected center of gravity 385 of the C-Axis subassembly 300C with the stylus probe 310 and counterweight 370 mounted on the probe head.

FIG. 6C shows an embodiment of the C-Axis subassembly having a laser probe 320 mounted on one interface 350 and a counterweight 370 mounted on the opposite interface 350. FIG. 6D shows the C-Axis subassembly 300C of FIG. 6C attached to the other subassemblies 300B, 300A of a rotary probe head 300. FIG. 6D also shows the expected center of gravity 385 of the C-Axis subassembly 300C with a laser probe 320 and counterweight 370 attached.

A counterweight 370 mounted on the opposite interface 350 can reduce the amount of torque generated on the A-axis by the payload, particularly one having a large mass, such as a laser head 320. The purpose of the counterweight 370 is to move the center of gravity as close to the A-axis as possible in order to reduce the A-axis motor holding torque. Ideally, a counterweight 370 having a mass that is substantially the same as the mass of the payload on the opposite interface will reduce the torque on the A-axis to almost zero. It will be noted that, as used herein, the term "mass that is substantially the same" means that the mass of the counterweight 370 plus the mass of the remaining system on the opposite side of the laser head is substantially equal the mass of the laser head payload, as the motor and other components already partially counter the mass of the laser head payload because they are positioned on the opposite side of the A-axis. Therefore, the added counterweight 370 does not necessarily need to be quite as heavy as the laser head payload itself. It should be noted that in certain embodiments, between the two interfaces 350, the bulk of internal component mass (i.e., motor, bearings, spindle) is positioned as far as possible from the heavy payload to act as a built-in partial counterweight within the rotary probe head system. With such a built-in partial counterweight, the mass of an external counterweight 370 for heavy payloads (e.g., laser scanner) does not need to be quite so large, to balance the center of gravity. A counterweight 370 having a large mass could potentially exceed the holding force of an interface 350. The built-in counterweighting however, can act unfavorably during use of a very light payload (e.g., stylus probe) and may require the use of an external counterweight 370 where one would normally not be necessary. With the built-in counterweighting as well as the capability of attaching an external counterweight to help split the difference between heavy and light payloads, a rotary probe head is provided that is capable of balanced touch sensing using a light stylus probe as well as laser scanning with high performance while minimizing heat generation.

Furthermore, because the counterweight 370 is removable, customized counterweights can be mounted on an interface 350 depending on the type of probe attached to the opposite interface 350. It will be understood that the closer the center of gravity of both the payload and the counterweight combined is to the motor axes, the lower the load on the motors, especially the A motor.

Figure 7A:
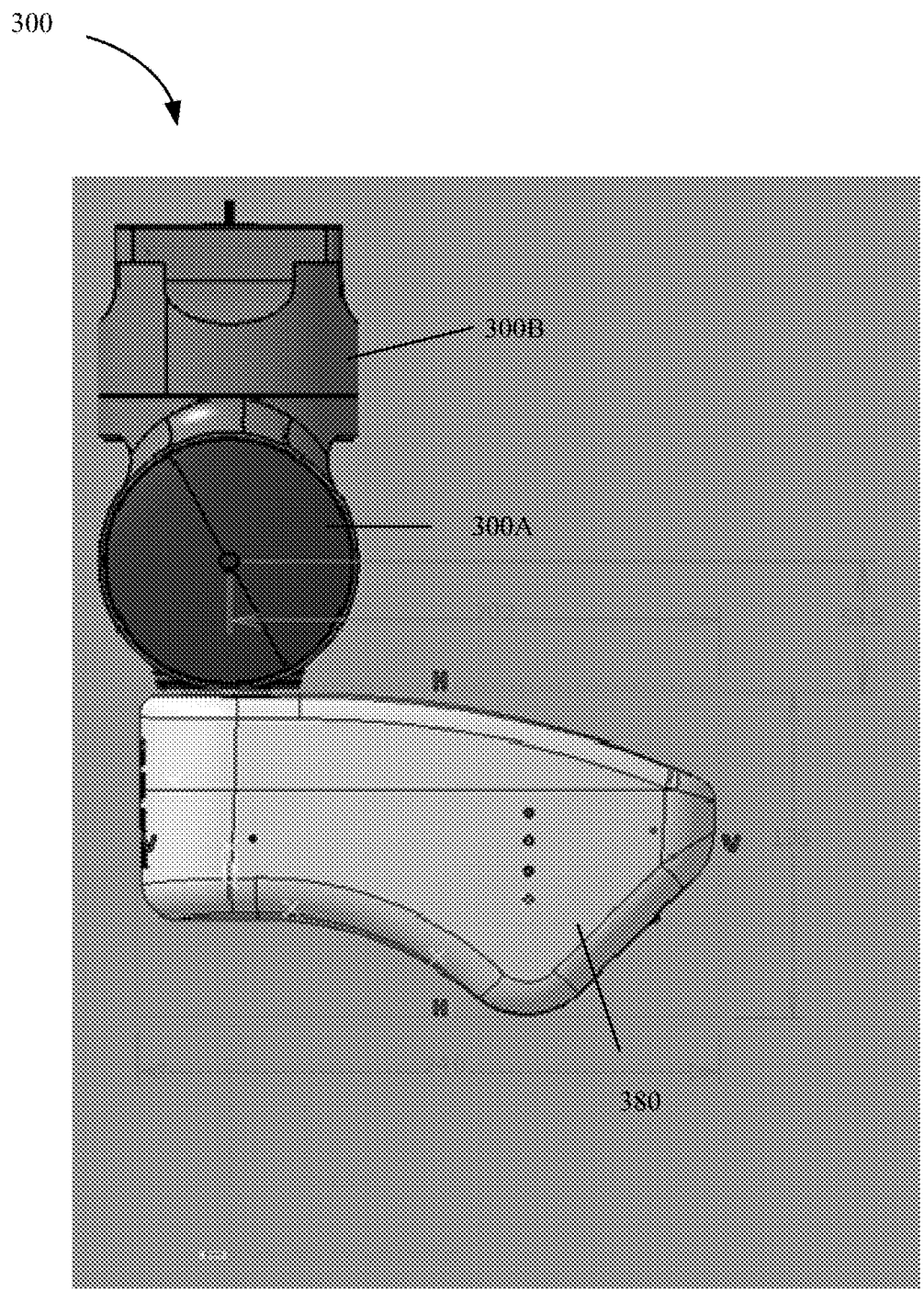

Another benefit of having a counterweight 370 mounted on a rotating interface 350 is that the counterweight 370 can rotate along with an off-axis probe payload 380 mounted on the opposite rotating interface 350. The ability to rotate the counterweight 370 is important because there may be scenarios in which the center of gravity of the probe payload 380 is off-axis (laser head not in the center of the C-rotational axis), as shown in FIGS. 7A-7C. As can be seen, the center of gravity of the off-axis probe head 380 is not in line with the C-axis such that there is a moment on the A-axis. This moment will change as the laser head 380 rotates in and out of the page, as shown in FIG. 7A, on the C-axis.

In such a situation, a counterweight 370 mounted on the opposite interface 350 with a center of gravity on the C-axis will not fully counter the moment generated by the off-axis probe payload 380, especially if the off-axis probe payload 380 is rotating on the C-axis. However, if the counterweight 370 is designed such that the center of gravity is offset by an equal and opposite amount of the off-axis probe payload 380 (e.g., rotating laser head), then the counterweight 370 can balance the gravitational torque of the rotating off-axis probe payload 380, even during C-axis rotation. FIGS. 7B and 7C show a counterweight 370 having a center of gravity 390 that is in line with the center of gravity 392 of the off-axis probe payload 380. In other words, the centers of gravity 390, 392 are on the same axis. As shown in FIGS. 7B and 7C, the centers of gravity 390, 392 of the counterweight 370 and the off-axis probe payload 380 are also in line with (and on the same axis as) the center of gravity 394 of the probe mount or C-Axis subassembly 300C.

According to an embodiment, the counterweight 370 can be attached to an interface 350 using a rigid element, such as a rod 395, as shown in FIG. 7C. It will be understood that the attachment of the counterweight 370 to the interface 350 is not shown in FIG. 7B because of the orientation of the probe mount 300C illustrated in FIG. 7B. With the attachment by a rigid rod 395, as shown in FIG. 7C, the counterweight 370 and its center of gravity 392 can rotate with the off-axis probe payload 380 and its center of gravity 392 such that the centers of gravity 390, 392 remain aligned with the center of gravity 392 of the probe mount 300C in order to balance the gravitational torque of the rotating off-axis probe payload 380. The moment generated by the off-axis probe payload 380 is thus minimized by the counterweight 370.

According to an embodiment, as shown in FIG. 7C, a shifter can be provided in the probe mount 300C to shift the counterweight 370 in a direction that is not parallel to the C-axis in order to minimize the moment generated by an off-axis probe payload 380. For example, if a different off-axis probe payload 380 is attached to an interface 350, then the counterweight 370 and its center of gravity 390 may need to be shifted to line up with the center of gravity 392 of the new off-axis probe payload 380. The shifter can rotate the counterweight 370 about the C-axis. According to an embodiment, the shifter can include a rigid rod 395 that is retractable and also a motor 398 within the probe mount 300C that rotates the rod 395. In some embodiments, this motor 398 is the same motor that rotates the interface 350 to which the probe payload 380 is attached.

It will be understood that a product of the distance between a position of the center of gravity of the probe and the A-axis and the mass of the probe is substantially equal to a product of the distance between a position of the center of gravity of the counterweight and the A-axis and the mass of the counterweight.

In addition to mounting counterweights, the interfaces 350 can be used to mount other items, such as rotational motors, telescoping actuators, load cells, accelerometers, thermistors, thermocouples, heat sinks, and batteries. According to an embodiment, one interface is configured for mounting one type of probe or counterweight and the other interface is configured for mounting a different type of probe or counterweight. The placement on the rotary probe head of the two interfaces can be reversed.

Figure 8:
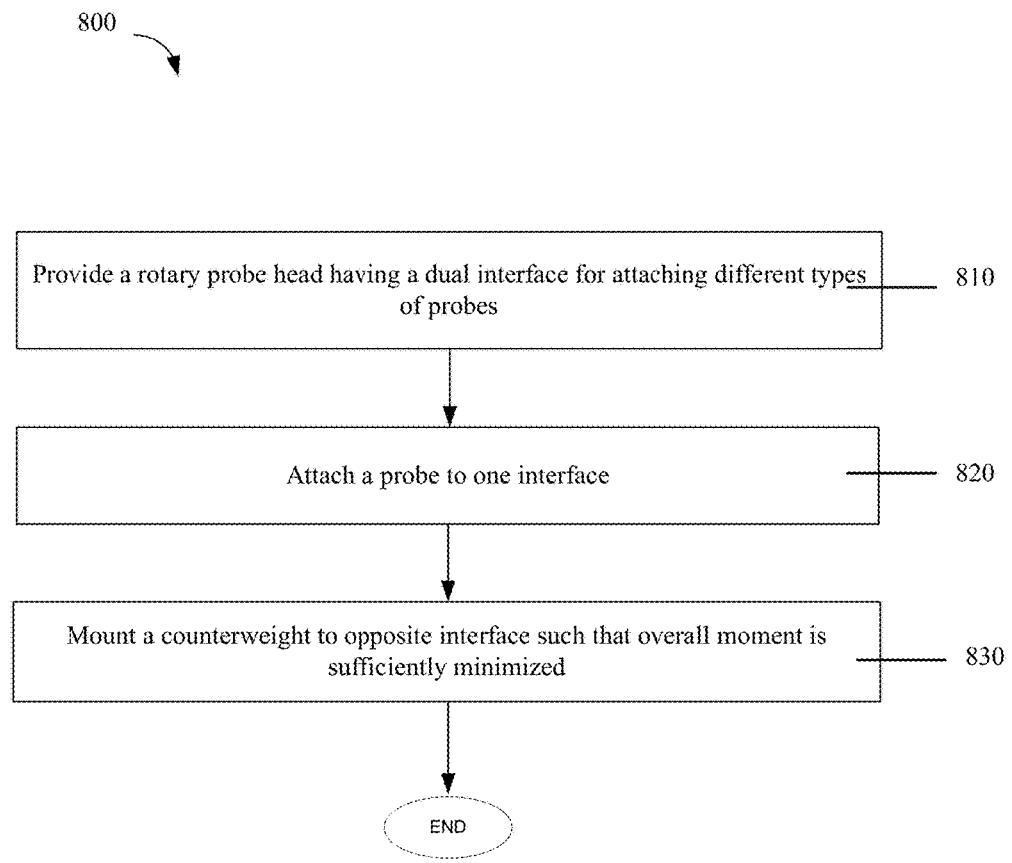
FIG. 8 is a flow chart of a process for using a rotary probe head in accordance with embodiments described herein.

FIG. 8 is a flow chart of a process 800 for using a rotary probe head in accordance with embodiments described herein. In step 810, a rotary probe head having a dual interface is provided for attaching different types of probes. According to this embodiment, in step 820, a probe, such as a laser head or stylus probe, is attached to an interface on the rotary probe head. In step 830, a counterweight is mounted to the opposite interface on the rotary probe head such that overall moment is sufficiently minimized It will be understood that the mass of the counterweight is similar to or substantially the same as that of the probe. If the probe that is mounted in step 820 is a rotating off-axis payload, the counterweight in step 830 is mounted on the opposite interface to is offset the off-axis center of gravity of the payload by an equal and opposite amount.

Although only a few embodiments of the invention have been described in detail, it should be appreciated that the invention may be implemented in many other forms without departing from the spirit or scope of the invention. In view of all of the foregoing, it should be apparent that the present embodiments are illustrative and not restrictive and the invention is not limited to the details given herein, but may be modified within the scope and equivalents of the appended claims. The description herein describes a rotating probe head that can be mounted on a CMM having localizers, such as a x-axis moving mechanism, a y-axis moving mechanism and a z-axis moving mechanism for positioning the rotating probe head in three dimensional areas. However this invention is suitable for any type of coordinate positioning apparatus that has one or more axis of movement. For example, the rotating probe head may be mounted on a multiple articulated arm having six or seven articulated axes, robot arm and a single axis system.

What is claimed is:

1. A rotary probe head, comprising:
    a main body configured to rotate about a first axis;
    a stem subassembly for connecting the main body with a spindle of a coordinate measuring machine, the stem subassembly configured to rotate about a second axis, wherein the main body and the stem subassembly are rotatably attached; and
    a rotating probe mount rotatably attached to the main body, the rotating probe mount having a first interface for attaching a probe, wherein the first interface is configured to rotate about a third axis, and wherein a counterweight is attached on a side of the probe mount opposite the first interface, and wherein the counterweight is configured to shift along a direction not parallel to the third axis.

2. The rotary probe head of claim 1, further comprising a counterweight shifter arranged in the rotating probe mount, the shifter configured to shift the counterweight about the third axis.

3. The rotary probe head of claim 2, further comprising a motor within the rotating probe mount for rotating the probe attached to the first interface.

4. The rotary probe head of claim 3, wherein the motor is a driving source of the counterweight shifter.

5. The rotary probe head of claim 1, wherein a motor within the stem subassembly rotates the main body about the first axis.

6. The rotary probe head of claim 1, wherein a motor within the main body rotates the rotating probe mount about the second axis.

7. The rotary probe head of claim 1, further comprising a second interface for attaching the counterweight, wherein the first interface and the second interface are on opposite sides of the rotating probe mount.

8. The rotary probe head of claim 7, wherein the first and second interfaces are interchangeable.

9. The rotary probe head of claim 1, wherein a mass of the probe and amass of the counterweight are substantially equal.

10. The rotary probe head of claim 9, wherein a product of the distance between a position of a center of gravity of the probe and the first axis and the mass of the probe is substantially equal to a product of the distance between a position of a center of gravity of the counterweight and the first axis and the mass of the counterweight.

11. A coordinate measuring machine for measuring geometrical characteristics of an object, comprising:
    a rotary probe head according to claim 1;
    a localizer for positioning the rotary probe head; and
    a probe for attaching to the rotary probe head.

12. A method for using a rotary probe head, the method comprising:
    providing a rotary probe head having a probe mount having a first interface and a second interface, the first and second interfaces mounted on opposite sides of the probe mount relative to a first axis of the rotary probe head, and wherein each of the first and second interfaces is configured for attaching a probe or counterweight;
    attaching a probe to the first interface; and
    attaching a counterweight to the second interface, the counterweight having a moment that substantially counteracts a moment of the probe attached to the first interface.

13. The method of claim 12, further rotating the probe.

14. The method of claim 12, further comprising shifting the counterweight such that a center of gravity of the counterweight is in line with a center of gravity of the probe and a center of gravity of the probe mount.

15. The method of claim 14, further comprising rotating the counterweight such that center of gravity of the counterweight remains in line with the center of gravity of the probe and the center of gravity of the probe mount when the probe and counterweight are rotated.

16. The method of claim 12, wherein the probe is a laser probe.

17. The method of claim 12, wherein the probe is a stylus probe.

18. The method of claim 12, wherein attaching the counterweight reduces an amount of holding torque required on the first axis generated by attachment of the probe to the first interface.

19. The method of claim 12, wherein the first and second interfaces rotate about a second axis and the probe has a center of gravity that is not on the second axis and the counterweight is attached to the second interface such that a center of gravity of the counterweight is offset from the second axis such that a center of gravity of the counterweight is on a same axis as a center of gravity of the probe and a center of gravity of the probe mount.

20. The method of claim 12, further comprising rotating the rotary probe head about a third axis.

\* \* \* \* \*

UNITED STATES PATENT AND TRADEMARK OFFICE
CERTIFICATE OF CORRECTION

PATENT NO. : 10,107,654 B2
APPLICATION NO. : 15/255108
DATED : October 23, 2018
INVENTOR(S) : Chang et al.

Page 1 of 1

It is certified that error appears in the above-identified patent and that said Letters Patent is hereby corrected as shown below:

In the Claims

1. In Line 2 of Claim 9 (Column 8, Line 23) change "amass" to --a mass--.

Signed and Sealed this
Twelfth Day of February, 2019

Andrei Iancu
*Director of the United States Patent and Trademark Office*